United States Patent [19]

Fukuyama et al.

[11] 4,296,364
[45] Oct. 20, 1981

[54] TOOL COMPENSATION SYSTEM

[75] Inventors: Hiroomi Fukuyama, Hachioji; Shinichi Isobe, Tachikawa, both of Japan

[73] Assignee: Fujitsu Fanuc Limited, Japan

[21] Appl. No.: 134,120

[22] Filed: Mar. 26, 1980

[30] Foreign Application Priority Data

Sep. 27, 1978 [JP] Japan .................... 53-118840

[51] Int. Cl.³ .................................... G05B 19/25
[52] U.S. Cl. ............................ 318/572; 318/632; 318/603; 364/571; 364/474
[58] Field of Search ............ 318/632, 561, 572, 603; 364/571, 105, 474; 408/10, 11, 12, 13; 51/165.87; 83/527, 528, 529, 530, 62.1, 69, 72, 74, 75

[56] References Cited

U.S. PATENT DOCUMENTS 3,840,792 10/1974 Yokoe ........................ 318/572
4,176,396 11/1979 Howatt ....................... 364/474

Primary Examiner—S. J. Witkowski
Assistant Examiner—Eugene S. Indyk
Attorney, Agent, or Firm—Staas & Halsey

[57] ABSTRACT

When machining with a numerical-controlled machine tool, both a command value providing the configuration of a finished product and a compensation value depending on the tool are needed, and tool compensation data must be corrected in response to tool wear. The present invention, taking notice of the fact that correction data corresponding to tool wear can be predetermined from the frequency or time of tool use and the fact that the amount of tool wear can be unequivocally determined by the quality of materials of the tool and work, provides circuitry for counting the frequency or time of use of the tool and circuitry for correcting by a predetermined value the content of a compensation value register having tool compensation date when the number of times a tool has been used or when the duration of tool use has reached a predetermined value.

11 Claims, 4 Drawing Figures

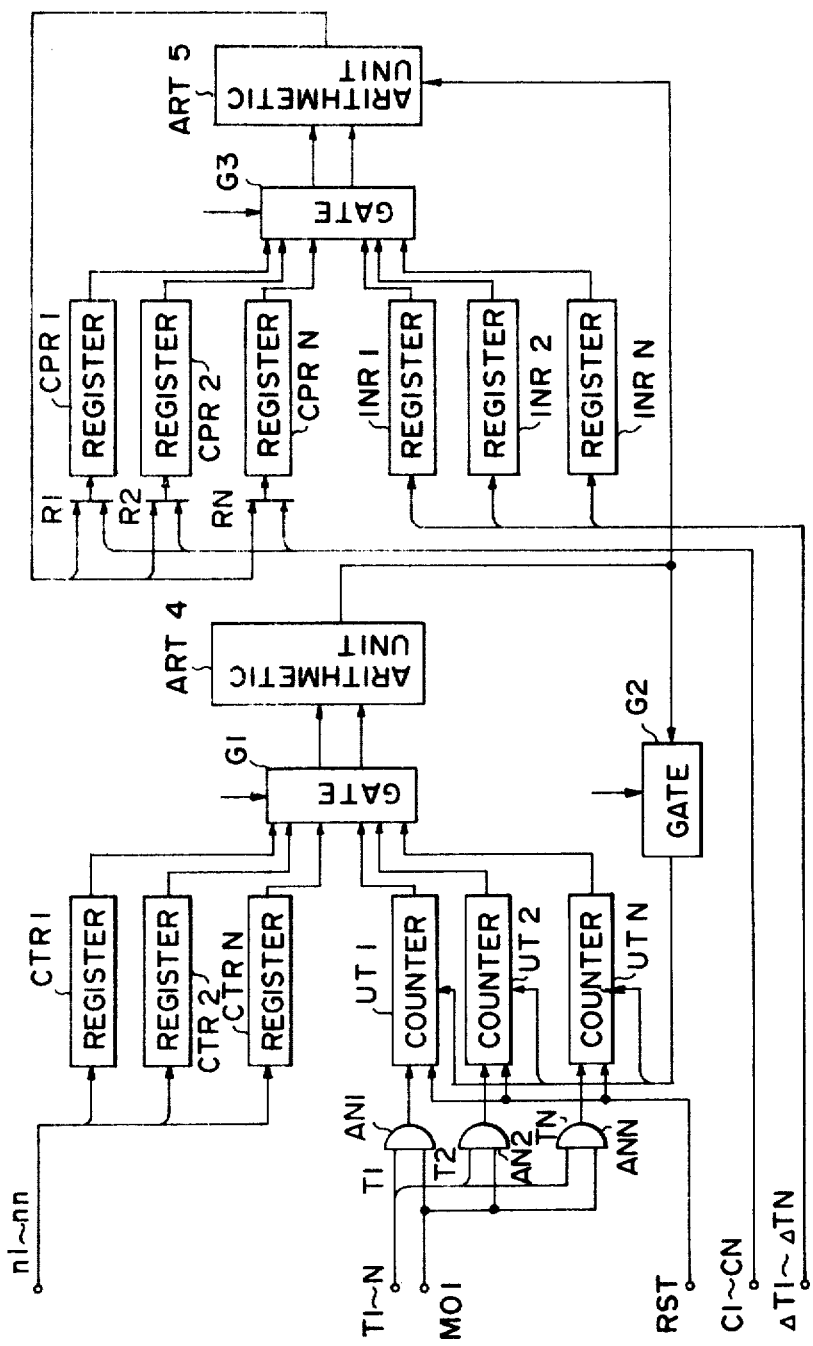

TOOL COMPENSATION SYSTEM

BACKGROUND OF THE INVENTION

1. Field of the Invention

This invention relates to improvements in a tool compensation system for numerical control of machine tools and the like, and more particularly to a tool compensation system which is capable of automatically correcting tool compensation data.

2. Description of the Prior Art

In the prior art, a tool compensation value is determined by an operator who measures the size of an actually cut work or by a measuring instrument mounted on the machine.

The compensation data thus determined are entered by the operator into a numerical controller, or the compensation data obtained by the measuring instrument are entered into the numerical controller via a special interface. Accordingly, the former method requires measurement at a proper time and hence is troublesome, whereas the latter method involves the use of a measuring instrument and an interface and consequently increases the cost; thus, these conventional methods are not preferred. Nowadays, there is a strong demand for automatic tool compensation without raising the cost.

SUMMARY OF THE INVENTION

It is an object of the present invention to provide a tool compensation system which permits automatic correction of tool compensation data without the necessity of an automatic measuring instrument and an interface.

Briefly stated, according to this invention, tool compensation data are automatically corrected by a present value each time the number of times a tool is used or the duration of tool use exceeds a predetermined value.

BRIEF DESCRIPTION OF THE DRAWINGS

FIGS. 3 and 4 are block diagrams, similar to FIG. 2, respectively illustrating other embodiments of the present invention.

DESCRIPTION OF THE PREFERRED EMBODIMENTS

Figure 1:
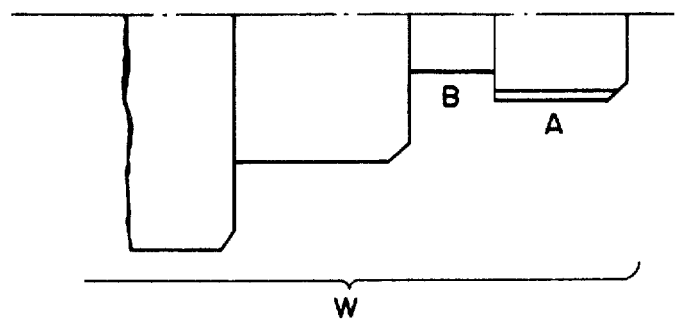
FIG. 1 is a schematic diagram explanatory of a principal part of a work subjected to a turning operation.

In ordinary working, several tools are employed in accordance with particular parts of a work to be machined. For example, in the cutting of such a work as shown in FIG. 1, there are required, in addition to rough and finish machining tools, various tools for respective parts of the work, such as a screw cutting tool for a part A, a cutting-off tool for a part B, etc. The amounts of wear of the respective tools usually differ from one another. These amounts of wear can easily be known from the tools and the quality of material of the work. Accordingly, it is possible to preset data, for example, for increasing the amount of compensation of the tool for the part A by $\Delta T1$ after n1 machining operations, the amount of compensation of the tool for the part B by $\Delta T2$ after n2 machining operations, etc. In the present invention, these data are prestored in the memory of numerical control equipment or entered as input instructions to automatically modify the compensation data in response to the wear of each tool.

Figure 2:
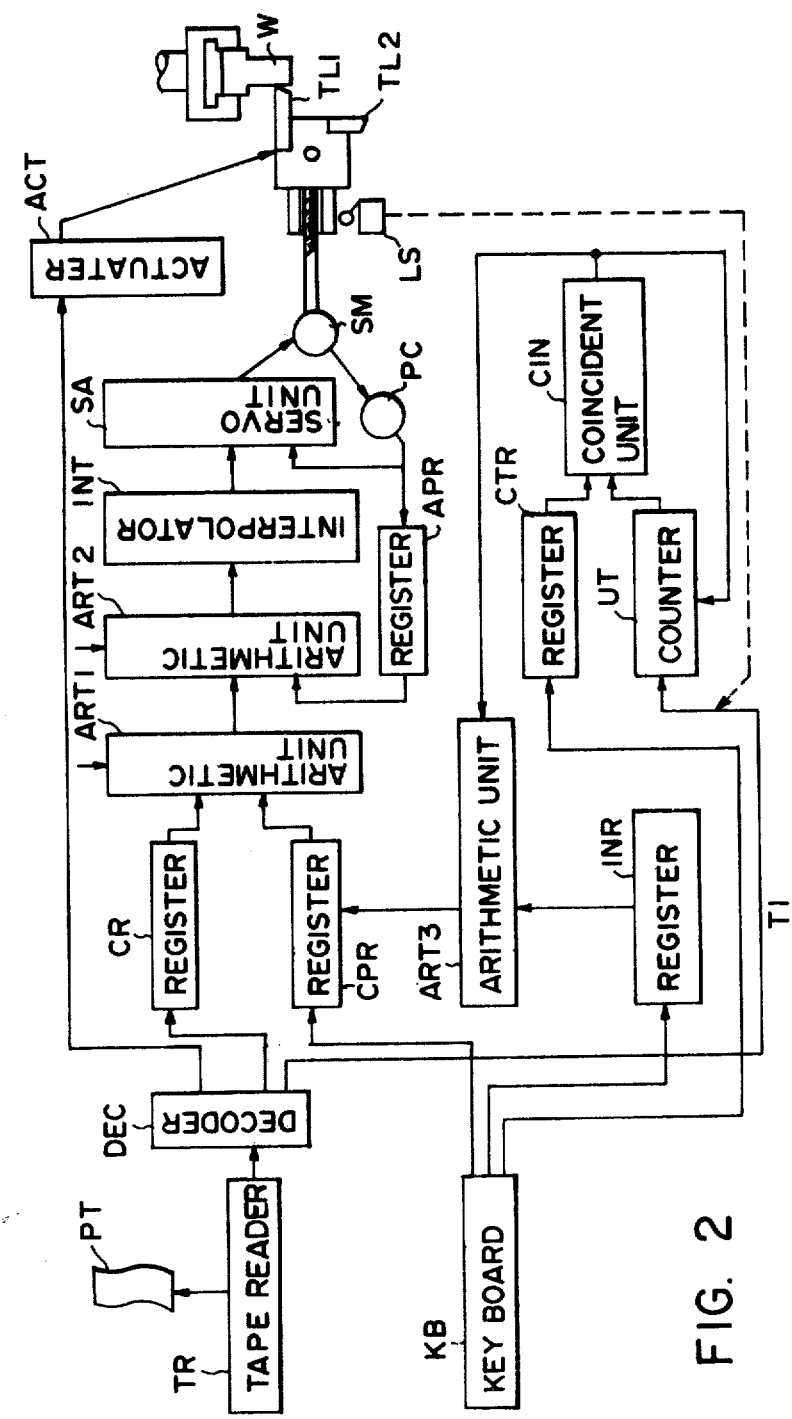
FIG. 2 is a block diagram showing the principal part of an embodiment of the tool compensation system of the present invention.

FIG. 2 illustrates in a block form an example of a numerical-controlled machine tool embodying the present invention. In FIG. 2, reference character PT indicates a command tape having recorded thereon data for the amounts of movement of tool and, command data such as tool select instructions and so forth; TR designates a tape reader; DEC identifies a decoder; CR denotes a command value register; KB represents a keyboard; CPR shows a compensation value register; ART1 to ART3 refer to arithmetic circuits; APR indicates a current value register; INT designates an interpolator; SA identifies a servo circuit; SM denotes a servo motor; PC represents a pulse coder; ACT shows an actuator for tool change use; TL1 and TL2 refer to tools; W indicates a work; INR designates a compensation data storing register; UT identifies a counter for counting the frequency of the use of a tool; CTR denotes a register for setting the number of times a tool is used; and CIN represents a coincidence circuit.

In FIG. 2, in response to a tool select command (for example, T1) from the command tape PT the tool changing actuator ACT operates to select the tool TL1, and compensation data corresponding to the tool TL1 are preset in the register CPR from the keyboard KB. A movement command value from the command tape PT is set in the register CR via the tape reader TR and the decoder DEC and, in the compensation, the compensation data are algebraically added by the arithmetic circuit ART1 to the movement command value. The resulting compensated command value is algebraically added by the arithmetic circuit ART2 to the content of the register APR, and the difference between them is provided to the interporator INT to effect positioning of the tool TL1. The wear $\Delta T1$ of the tool TL1 after use n1 times is obtained from previous experience. These data n1 and $\Delta T1$ are entered from the keyboard KB and stored in the registers CTR and INR respectively. Upon each occurrence of a select command T1 for the tool TL1 from the command tape PT, the command is counted by the counter UT. Accordingly, when the tool TL1 has been selected and used n1 times, it is detected by the coincidence circuit CIN, and the content $\Delta T1$ of the register INR is added via the arithmetic circuit ART3 to the content of the register CRR, thereby correcting the compensating data. The counter UT is reset by a coincidence signal and counts again the tool select commands, by which the operation described above is repeated and the compensation data is corrected by correction data $\Delta T1$ each time the tool TL1 is used n1 times. As the input to the counter UT, use can also be made of a signal available from a limit switch LS which is activated by the arrival of the movable machine part at a predetermined reference point (for example, the point of termination of one machining operation).

FIG. 3 is a block diagram showing another example of the compensator embodying the present invention. In FIG. 3, reference characters CPR1 and CPRN indicate compensation value registers; INR1 to INRN designate compensation data registers; UT1 to UTU identify counters for counting the number of times the tools are used; CTR1 to CTRN denote registers for setting the frequency of tool use; AN1 to ANN represent AND circuits; G1 to G3 show gates; and ART4 and ART5 refer to arithmetic circuits.

In FIG. 3, reference character RST indicates an initial reset signal; n1 to nn designate set values of the number of uses of respective tools; C1 to CN identify compensation values of the tools; and ΔT1 to ΔTN denote correction values of the tools. These data are entered in advance from the keyboard and set in the registers corresponding to them.

In FIG. 3, pluralities of registers and counters are provided for each of a plurality of tools. As inputs to the counters UT1 to UTN, use is made of the logical products of each of the tool select commands T1 to TN and an auxiliary code M01 similarly prerecorded on the command tape.

The gate G1 reads out the contents of corresponding ones of the registers CTR1 to CTRN and the counters UT1 to UTN into the arithmetic circuit ART4 in a repeating cyclic order with a predetermined period. When coincidence of the contents is detected by the arithmetic circuit ART4, the corresponding one of the counters UT1 to UTN is reset and, at the same time, the content of the corresponding one of the registers INR1 to INRN is added to the corresponding one of the registers CPR1 to CPRN.

Figure 4:
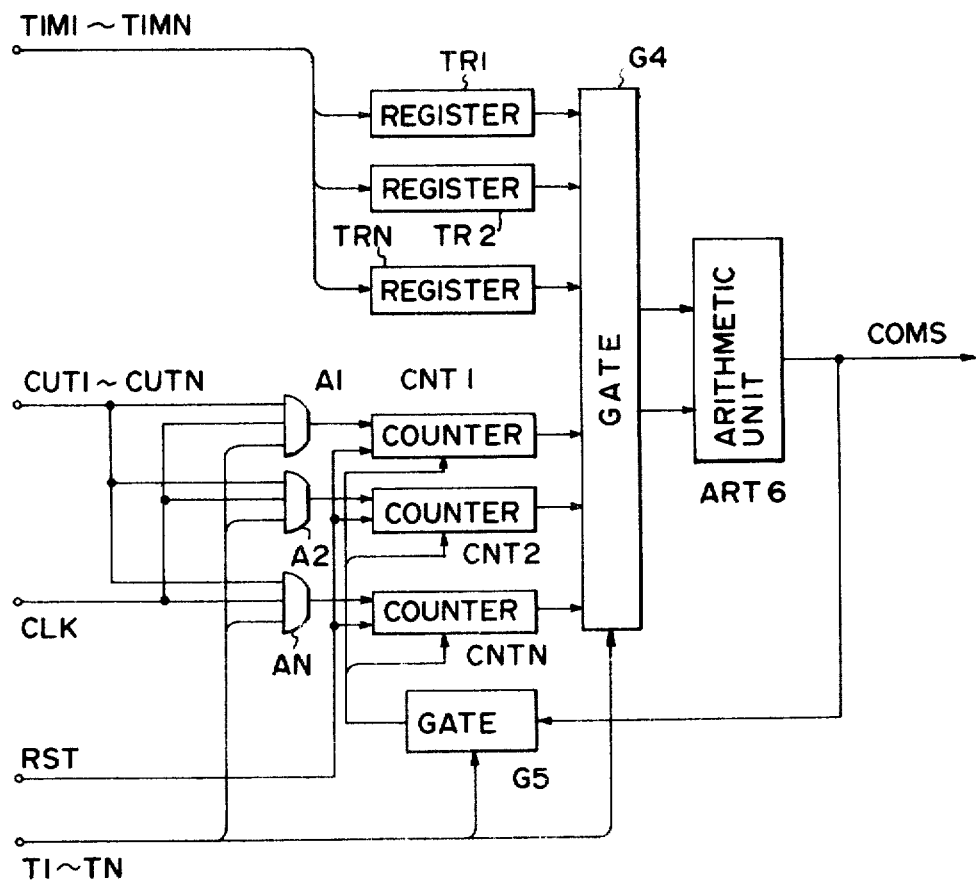

FIG. 4 shows in block form another example of the present invention, in which counters CNT1 to CNTN receive, as input signals, the logical products of the tool select commands T1 to TN, cutting commands CUT1 and CUTN and a reference pulse CLK via AND circuits A1 to AN. Accordingly, in the example of FIG. 4, the content of each of the counters CNT1 to CNTN represent the time of use of the corresponding tool, and these counter contents and values preset in the registers TR1 to TRN are compared.

Namely, the value set in the registers TR1 to TRN and the contents of the counters CNT1 to CNTN are compared by an arithmetic circuit ART6 via a gate G4. Upon detection of coincidence, a compensation value register content correction command COMS is obtained and the content of the corresponding counter is reset via a gate G5.

As has been described in the foregoing, the present invention provides an inexpensive tool compensation equipment which permits automatic correction of a tool compensation value without the necessity of a measuring instrument and a special interface circuit.

It will be apparent that many modifications and variations may be effected without departing from the scope of the novel concepts of this invention.

What is claimed is:

1. In a tool compensation system of the type which includes a command value register for storing a movement command value, a compensation value register for storing a tool compensation value, and means for shifting a tool from a position represented by the movement command value to a position spaced apart therefrom a distance corresponding to the tool compensation value, the improvement comprising:
    first means for counting the amount of use of the tool; and
    second means responsive to said first means for correcting the content of the tool compensation value register by a preset value each time the count value of the first means has reached a predetermined value.

2. The system of claim 1, further comprising a limit switch positioned to be activated when the tool arrives at a predetermined reference point, and wherein the first means comprises means for counting the number of times the limit switch is activated.

3. The system of claim 1, further comprising means for emitting a tool select command corresponding to the tool, and wherein the first means comprises means for counting the number of times the tool select command appears.

4. The system of claim 1, 2 or 3, wherein the second means comprises first register means for storing the predetermined value, coincidence means responsive to the first means and to the first register means for emitting a coincidence signal when the count value of the first means is equal to the predetermined value stored in the first register means, second register means for storing the preset value, and means responsive to the coincidence means and to the second register means for adding the preset value stored in the second register means to the tool compensation value stored in the compensation value register when the coincidence signal appears.

5. The system of claim 4, wherein the coincidence signal resets the first means.

6. A tool compensation system for use with a numerical-controlled machine which machines a workpiece using a plurality of tools having predetermined wear rates, comprising:
    first means for selectively moving the tools into cutting position against the workpiece;
    second means for storing a tool movement command corresponding to a predetermined cutting movement of the selected tool;
    third means for storing tool compensation values of each of the plurality of tools;
    fourth means for storing tool wear rate data for each of the plurality of tools;
    fifth means for storing tool usage data for each of the plurality of tools;
    sixth means for using the tool wear rate data stored in the fourth means and the tool usage data stored in the fifth means to correct the corresponding tool compensation value stored in the third means every time the corresponding tool has had a predetermined amount of usage; and
    seventh means responsive to the second and sixth means for combining the tool movement command and the tool compensation value of the selected tool to obtain a compensated tool movement command value for moving the selected tool.

7. The system of claim 6, wherein the third means comprises a plurality of first register means for storing tool compensation values, each of the first register means corresponding to one of the plurality of tools, wherein the fourth means comprises a plurality of second register means for storing predetermined values corresponding to the amounts of tool wear during predetermined numbers of tool usages and a plurality of third register means for storing the predetermined numbers of tool usages, each of the second and third register means corresponding to one of the plurality of tools, and wherein the fifth means comprises a plurality of counter means, each corresponding to one of the plurality of tools, for storing tool usage data by counting the number of times each tool is used.

8. The system of claim 7, wherein the sixth means comprises eighth means for comparing the contents of the third register means and the counter means corresponding to each of the plurality of tools and for producing a coincidence signal when equality is detected.

9. The system of claim 8, wherein the sixth means further comprises ninth means responsive to the coincidence signal from the eighth means for adding the contents of the first and second register means corresponding to the third register means and the counter means whose contents are equal.

10. The system of claim 6, wherein the third means comprises a plurality of first register means for storing tool compensation values, each of the first register means corresponding to one of the plurality of tools, wherein the fourth means comprises a plurality of second register means for storing predetermined correction values corresponding to amounts of tool wear during predetermined time periods of tool usage and a plurality of third register means for storing the predetermined time periods, each of the second and third register means corresponding to one of the plurality of tools, and wherein the fifth means comprises a plurality of counter means, each corresponding to one of the plurality of tools, for storing tool usage data by storing the time each tool has been in use.

11. The system of claim 10, wherein the sixth means comprises eighth means for comparing the contents of the third register means and the counter means corresponding to each of the plurality of tools and producing a coincidence signal when equality is detected.

* * * * *